United States Patent
Drda et al.

(10) Patent No.: US 9,184,655 B2
(45) Date of Patent: Nov. 10, 2015

(54) METHOD AND SEMICONDUCTOR DEVICE FOR A DEDICATED STARTUP SEQUENCE IN A RESONANT CONVERTER

(71) Applicant: Semiconductor Components Industries, LLC, Phoenix, AZ (US)

(72) Inventors: Vaclav Drda, Valassaka Bystrice (CZ); Roman Stuler, Karolinka (CZ); Pavel Latal, Roznov Pod Radhostem (CZ); Antonin Rozsypal, Hutisko-Solanec (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 135 days.

(21) Appl. No.: 14/216,525

(22) Filed: Mar. 17, 2014

(65) Prior Publication Data

US 2015/0263602 A1    Sep. 17, 2015

(51) Int. Cl.
*H02M 3/335* (2006.01)
*H02M 1/36* (2007.01)
*H02M 1/08* (2006.01)

(52) U.S. Cl.
CPC ...... *H02M 1/36* (2013.01); *H02M 1/08* (2013.01); *H02M 3/33507* (2013.01)

(58) Field of Classification Search
CPC ......... H02M 1/08; H02M 1/36; H02M 3/335; H02M 3/33507; H02M 2001/0054
See application file for complete search history.

(56) References Cited

U.S. PATENT DOCUMENTS

| 7,268,496 B2* | 9/2007 | Takahashi | H05B 41/295 315/105 |
| 7,660,133 B1* | 2/2010 | Hwang | H02M 3/33592 363/16 |
| 2014/0313790 A1* | 10/2014 | Feng | H02M 1/36 363/21.02 |
| 2015/0124488 A1* | 5/2015 | Dai | H02M 1/36 363/17 |

OTHER PUBLICATIONS

ST: L6699 "Enhanced high voltage resonant controller" Datasheet, Doc ID# 022835; Apr. 2012.
ON Semiconductor: NCP1397A, NCP1397B "High Performance Resonant Mode Controller with Integrated High-Voltage Drivers"; Publication Order # NCP1397/D; Nov. 2011.

* cited by examiner

*Primary Examiner* — Matthew Nguyen
(74) *Attorney, Agent, or Firm* — Robert F. Hightower (57) ABSTRACT

A method and semiconductor device for a resonant power converter includes logic circuitry that performs a dedicated startup sequence when power is first provided to the resonant converter. The logic circuitry can discharge the resonant capacitor, then iteratively pulse only an upper switch during a portion of the startup sequence, and measures the dead time between the half bridge signal starting to fall and the next time it finishes rising. If the dead time is greater that a startup exit value, which is based on the most recent upper switch on-time, then the upper switch on-time is incremented and the process is repeated until the dead time is less than the startup exit value, whereupon the startup logic transitions to conventional symmetric switching.

20 Claims, 7 Drawing Sheets

METHOD AND SEMICONDUCTOR DEVICE FOR A DEDICATED STARTUP SEQUENCE IN A RESONANT CONVERTER

FIELD OF THE DISCLOSURE

The present disclosure relates generally to switched resonant power converters, and more particularly to semiconductor devices that control switching in LLC resonant power converters and their operation during startup.

BACKGROUND

Switch mode power supplies are used in a wide variety of household and industrial appliances that require a regulated direct current (DC) voltage for their operation. There are a wide variety of known DC-DC converter topologies using PWM (pulse width modulation) or PFM (pulse frequency modulation) control to regulate output voltage.

One type of DC-DC converter topology is a resonant switched mode power converter. A resonant converter included in a resonant switched mode power converter controller with PFM utilizes resonant properties to provide natural soft switching in a closed loop to regulate the output. A resonant converter using PFM senses the power supply output and controls it by varying the switching frequency. An advantage of a resonant converter with PFM is that with the natural soft switching during normal operation, there is reduced switching loss compared to non-resonant power converter topologies. Another advantage is that resonant converter with PFM can be designed to operate at higher frequencies and in a smaller package sizes, than PWM converters, generally speaking.

Among a variety of resonant switched mode power converters are high frequency (HF) transformer isolated LLC converters, which have become increasingly popular in recent years. LLC resonant converters utilize the resonance between two inductors and a capacitor to provide natural soft switching. LLC resonant converters save on cost and size by utilizing the magnetizing and leakage inductance of the HF transformer as part of their resonance components. One disadvantage of some resonant converters is that the required wide range of frequency control result in more complicated electromagnetic interference (EMI) filter designs. However, with the gain characteristics of LLC resonant converters, output regulation can be achieved with a narrow band of frequency control.

While soft switching provides advantages during normal operation, this is not the case during startup, when the resonant converter is first started up and there is no energy in the LLC circuit. However, conventional resonant converters simply start symmetric switching at startup, and settle in response to feedback signals. Symmetric switching refers to alternately switching the upper and lower switches with equal on-times. However, rather than the soft switching that occurs with symmetric switching during normal operation, where there is energy in the resonant elements, during startup there can be hard, high current switching that must be addressed to prevent damage to the switching devices and other circuitry. Accordingly, the switching components have to be robust enough to deal with hard switching events during startup, which typically requires components that are larger than is necessary for normal operation. This is especially true for resonant converters that experience numerous startup events, such as in a device that is often turned on and off.

Accordingly, there is a need for a method and apparatus for reducing avoiding hard switching conditions at startup in a resonant converter.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Well known elements, structure, or processes that would be necessary to practice the invention, and that would be well known to those of skill in the art, are not necessarily shown and should be assumed to be present unless otherwise indicated.

DETAILED DESCRIPTION

Various embodiments of the disclosure include a semiconductor device having a control circuit for a resonant converter that includes a dedicated startup sequence circuit. Embodiments also include methods of performing a dedicated startup sequence for starting up a resonant converter before symmetric switching operation commences. In some embodiments a method of operating a semiconductor device including a resonant converter controller includes pulsing a lower switch drive signal initially for a preselected initial lower switch on-time, and then pulsing an upper switch drive signal for a preselected initial upper switch on-time subsequent to initially pulsing the lower switch drive signal. After pulsing the upper switch drive signal for the preselected initial upper switch on-time, the method includes iteratively measuring a dead time between a falling edge and a subsequent rising edge of a half bridge signal, and comparing a present dead time of a present iteration to a present startup exit value for the present iteration that is based on a present upper switch on-time for the present iteration. When the present dead time of the present iteration is above the startup exit value, the method further includes incrementing the upper switch on-time by a preselected factor and pulsing the upper drive signal for the incremented upper switch on-time responsive to an end of the rising edge of the half bridge signal. When the present dead time of an iteration is below the present startup exit value, the method further includes pulsing the upper switch drive signal again at the present upper switch on-time and setting a lower switch on-time to the present upper switch on-time. The method further includes commencing symmetric switching where the upper switch signal on-time and lower switching signal on-time are equal, responsive to the present dead time that is below the startup exit value.

Figure 1:
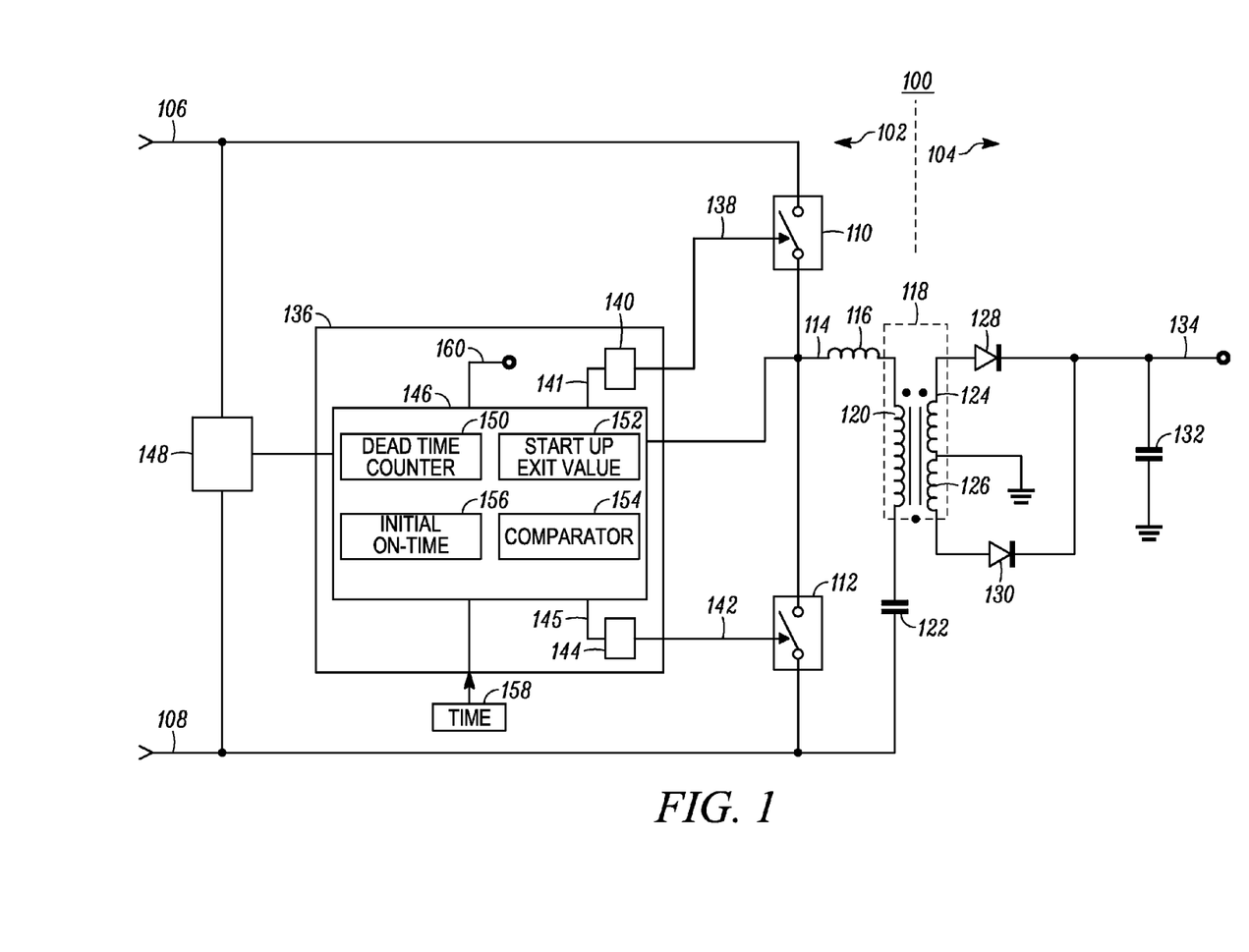
FIG. 1 is a block diagram of a LLC resonant converter including a semiconductor device having dedicated startup sequence control, in accordance with some embodiments.

FIG. 1 is a block diagram of a LLC resonant converter 100 including a semiconductor device having dedicated startup sequence control, in accordance with some embodiments. Generally, the resonant converter 100 includes a primary side 102 and a secondary side 104 that are electrically isolated from each other. A transformer 118 is used to magnetically link a primary winding 120 on the primary side 102 to one or more secondary windings 124, 126 on the secondary side 104.

The primary side 102 can be supplied by an input voltage between a positive input line 106 and a negative or ground line 108, which can be a direct current (DC) voltage produced by rectifying and filtering commercial alternating current (AC) service voltage, as is well known. The resonant converter 100 includes an upper switch 110 that is connected in series with a lower switch 112 between the positive input line 106 and the negative line 108. The upper and lower switches 110, 112 are typically transistor switches, and while ordinarily driven to either on or off states, can also be operated in a linear mode as with all transistors, when provided with an appropriate control signal level (i.e. gate voltage). A half bridge node 114 is formed between the upper switch 110 and the lower switch 112. Connected to the half bridge node 114 in series is a resonant inductance 116, a magnetizing inductance in the form of the primary winding 120, and a resonant capacitor 122. These elements make up a resonant tank circuit, and the amount of energy transferred to the secondary side 104 can be controlled by the switching frequency of upper and lower switching 110, 112, respectively. Energy can be transferred magnetically through the transformer 118 into secondary windings 124, 126. Each secondary winding 124, 126 is coupled to a rectifier 128, 130, respectively, that steer charge into a bulk capacitor 132 to produce an output voltage at output 134.

Control of the upper and lower switches 110, 112 is performed by a switch controller 136. The switch controller 136 can be a unitary packaged integrated circuit device, or it can be implemented discretely, or realized as a combination of integrated and discrete components. In addition to the switch controller 136, there can be other circuitry that support switching operation and other circuit functions of the primary side 102, such as, for example, sensor and feedback circuitry, clock circuitry, and so on, which are all commonly known to those skilled in the art. The switch controller 136 outputs an upper switch drive signal that can be provided to a control terminal of upper switch 110 on line 138, and an lower switch drive signal that can be provided to a control terminal of lower switch 112 on line 142. An upper drive circuit 140 can, responsive to input 141, provide the upper switch drive signal, and a lower drive circuit 144 can, responsive to input 145, provide the lower switch drive signal. The switch controller 136 includes circuitry that interfaces with the upper and lower drive circuits 140, 144 to control normal switching operation (i.e. during steady operation), and also includes a startup sequence circuit 146 that controls switching for a startup period, before a steady operating mode is achieved. The switch controller 136 receives inputs from the half bridge node 114, and the input voltage 106 via a sampling circuit 148, among other inputs. The sampling circuit 148 can be, for example, a voltage divider with filtering to produce a voltage proportional to the input voltage 106. The switch controller 136 can also receive input from a timing circuit 158 that can be external to the switch controller 136 and configurable to provide an indication of a desired time period for use in the startup sequence.

The startup sequence circuit 146 includes circuitry of a dead time counter 150, a startup exit value register 152, a comparator 154, and an initial on-time register 156, and provides an output 160. The output 160 indicates whether the startup sequence is in progress or whether startup is complete and ordinary symmetric switching can commence. The state of the output 160 can enable or disable a conventional symmetric switching circuit used to control switching of the upper and lower switches 110, 112 after the dedicated startup sequence is complete. The switching controller 136 can, in some embodiments, provide discharge functionality that allows the switch controller 136 to discharge the resonant capacitor 122 as an initial process in the startup sequence.

In one exemplary startup sequence, the startup sequence circuit 146 can detect the rise of the input voltage 106 to a preselected startup threshold using, for example, an output of the sampling circuit 148, and indicate on output 160 that startup is commencing, thereby inhibiting or otherwise preventing other circuitry in the switch controller 136 from attempting to drive the upper and lower switches 110, 112. As another preliminary matter, the switch controller 136 can discharge the resonant capacitor 122 such as by, for example, driving the lower switch 112 into a linear state, letting charge dissipate through the lower switch 112 and the inductances 116, 120 from the resonant capacitor 122 to the negative input line 108.

Subsequent to discharging the resonant capacitor 122, the startup sequence circuit 146 pulses the lower switch drive signal for a preselected initial lower switch on-time that can be set in the initial on-time register 156. As used in this disclosure, the term "pulse" refers to a signal that starts at a low level, sharply rises to a steady high level for a period of time, and then sharply falls back to the low level. The duration, or on-time, of the pulse is the time it remains at the high level, unless otherwise indicated. After the initial lower switch on-time pulse, the upper switch 110 is then driven on for an initial on-time. The initial on-times for the lower and upper switches can be configurable and set, for example, by external or internal programmable timing circuitry 158. When the upper switch 110 is turned on, the voltage at half bridge node 114 will rise to that of the input 106, and when the upper switch is turned off at the end of the initial upper switch pulse, the voltage at the half bridge node will fall to a low level due to the effect of the tank circuit (i.e. 116, 120, 122). When the voltage at the half bridge node 114 begins falling, the dead time counter 150 begins counting until the voltage at the half bridge node 114 rises and then ceases rising. That is, the dead time counter stops counting at the end of the rising edge of the voltage at the half bridge node 114. During the dead time, the lower switch 112 is not turned on as occurs during conventional switching operation. Thus, after the initial pulse of the lower switch 112, only the upper switch 110 is pulsed until the startup sequence is finished. The dead time count of the dead time counter 150 can be compared in the comparator 154 to a startup exit value 152. The startup exit value is based on the most recent on-time of the upper switch signal pulse. If the dead time is more than the startup exit value, then the upper switch on-time is incremented and the upper switch drive signal is pulsed again. It should be noted that since the dead time counter 150 stops when the voltage on the half bridge node 114 finishes rising, when the upper switch 110 is then turned on it is a zero voltage switching condition. This process repeats iteratively until the dead time of an iteration is less than the startup exit value. The upper switch 110 is then pulsed again with the last on-time, the output 160 is changed to enable symmetric switching, and then symmetric switching can commence. During symmetric switching the upper switch and lower switch are alternately switched on and off in a non-overlapping manner and with each having equal on-times.

Figure 2:
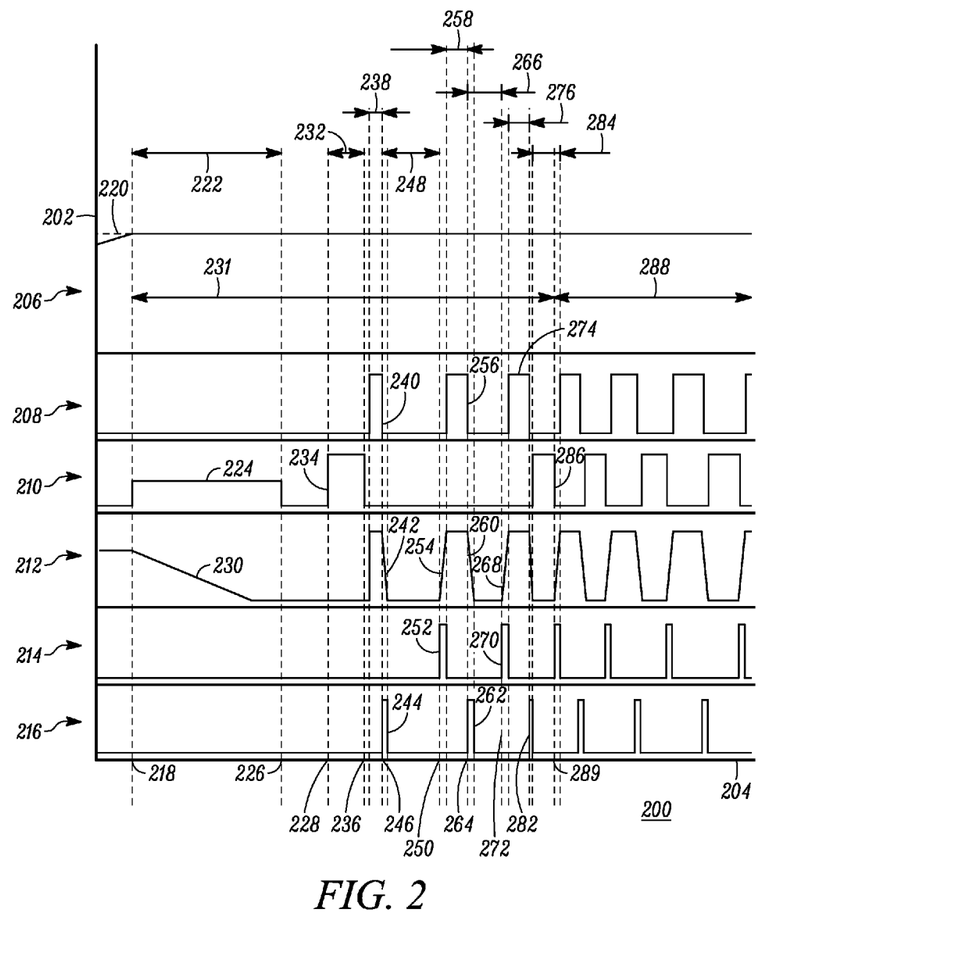
FIG. 2 is a timing diagram of signals produced by, and received at, a semiconductor device having dedicated startup sequence control for a resonant converter, in accordance with some embodiments.

FIG. 2 is a timing diagram 200 of signals produced by, and received at, a semiconductor device having dedicated startup sequence control for a resonant converter, in accordance with some embodiments. Generally, the vertical axis 202 represents signal level of the various signals being illustrated, increasing from bottom to top, and the horizontal axis 204 represents time, increasing from left to right. Shown are the input voltage 206, which can be a portion of the DC voltage resulting from converting an input AC supply to the DC voltage such as, for example, through rectifiers and a bulk filter, as is well known in the art. The diagram 200 also shows the upper switch drive signal 208, lower switch drive signal 210, and half bridge signal 212. The upper switch drive signal 208 can be, for example, a signal generated by the startup sequence circuit 146 of FIG. 1 to produce an upper drive signal on line 138, and the lower switch drive signal 210 can be, for example, a signal generated by the startup sequence circuit 146 to produce a lower drive signal on line 142. The half bridge signal 212 can be an example of the voltage at half bridge node 114 of FIG. 1. Also shown is positive differential signal 214 and a negative differential signal 216, which indicate, respectively, positive-going transitions and negative-going transitions of the half bridge signal 212. The positive-going and negative-going differential signals 214, 216 can be used in some embodiments to detect the start and end of the rising and falling edges, respectively, of the half bridge signal 212.

At the farthest left of the horizontal axis 204, the input voltage 206 is rising, as occurs when power is applied to the resonant converter. At time 218, the input voltage 206 reaches a startup threshold 220, which can be detected by the startup sequence circuit, initiating the startup sequence, which occurs over period 231. In some embodiments other startup conditions can be used in addition to, or as an alternative to detecting the input voltage 206. In some cases, the resonant capacitor may become charged to some degree, such as can occur when input voltage is removed, and then restored after a short time. Accordingly, prior to time 218, there can be a voltage evident on the half bridge signal 212 as a result of the resonant capacitor having charge in it. To ensure that the resonant converter is at known state, a brief discharge period 222 can be undertaken. During the discharge period 222, a load is applied to the half bridge node, and the charge in the resonant capacitor is depleted, as indicated by downward sloping portion 230 of the half bridge signal 212. In some embodiments the load used to discharge the resonant capacitor can be a dedicated discharge circuit internal to the switch controller, and in some embodiments the lower switch can be controlled to operate in a linear mode, as indicated by signal level in 224 of the lower switch drive signal 210, which is less than a level used to turn the lower switch completely on.

The discharge period 222 ends at time 226, and is sufficiently long to ensure complete discharge of the resonant capacitor. Alternatively, the voltage of the half bridge node 212 can be monitored to detect the voltage 212 falling below a discharge threshold. Between time 226 and time 228 there can be a wait time subsequent to the discharge period 222. Starting at time 228 the lower switch drive signal 210 is pulsed on for an initial on-time 232, ending at time 236. After a short guard time, the upper switch drive signal 208 is pulsed on for an initial time period 238, ending at time 246. During time 238, the half bridge signal 212 rises sharply because there is no energy in the resonant tank and therefore no zero voltage switching condition, and when upper switch drive pulse 240 ends, a falling edge 242 of the half bridge signal 212 results, producing a pulse 244 of the negative differential signal 216. The start of pulse 244 can be used to start a dead time clock, which measures the time until the half bridge signal 212 again rises and then stops rising. Due to the resonant nature of the LLC circuit, responsive to pulse 240, the half bridge signal 212 begins rising again at time 250, producing a rising or positive-going edge 254, and producing a pulse 252 in the positive differential signal 214. When pulse 252 ends, producing a negative-going transition from high to low, the half bridge voltage has stopped rising, and the dead time counter stops. At the end of pulse 252, the present on-time value of the upper switch drive signal is still equal to the initial on-time used for pulse 240. The value or count of the dead time counter is immediately compared to a startup exit value, which is derived from the present on-time used for the upper switch drive signal 208. In some embodiments, the startup exit value can be twice the present upper switch drive on-time. If the dead time 248 of the present iteration of the startup sequence is greater than the startup exit value, then the present on-time is incremented by a preselected factor and the upper switch drive signal 208 is pulsed again in pulse 256 for the incremented on-time 258 in a next iteration of the startup sequence. Pulse 256 ends at time 264, causing the half bridge signal 212 to start falling edge 260, and resulting in pulse 262 of the negative differential signal 216. Again, the start (rising edge) of pulse 262 resets and starts the dead time counter. It should be noted that, as used here, the dead time refers to a time between upper switch drive pulses in the startup sequence, and between which there are no lower switch drive signal pulses. Aside from the initial lower switch drive pulse 234, the lower switch drive signal 210 is not pulsed again until exiting from the startup sequence.

However, for the sake of example, assume that dead time 266 is less than the present startup exit value used for the present iteration. Rather than incrementing the upper switch on-time, the present upper switch on-time is repeated in subsequent pulse 274. Thus on-time 276 would be equal to on-time 258. At time 272 the half bridge signal 212 begins rising, responsive to prior pulse 256, producing pulse 270 of the positive differential signal 214. Since the startup exit criteria has been satisfied in the present example, the lower switch drive signal 210 is pulsed in pulse 286 for a duration 284 that is equal to the on-time 276 of pulse 274 of the upper switch drive signal 208. Thereafter, starting at time 289, symmetric switching occurs in post-startup time 288. After the startup period 231, during time 288, there can be a soft start sequence where the pulse frequency is adjusted to the load at the output of the resonant converter, based on feedback and other criteria used for adjusting switching frequency, as is known.

Figure 3:
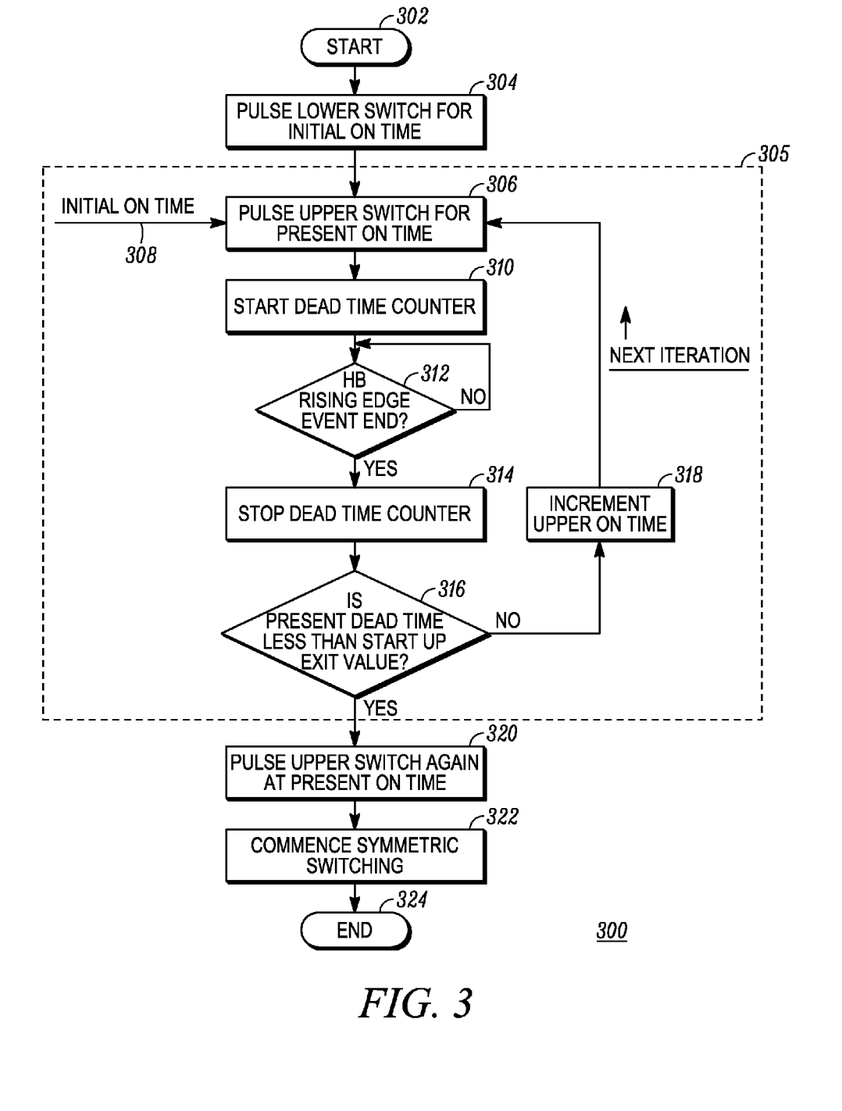
FIG. 3 is a high level flow chart of an iterative method of adjusting pulse time for a semiconductor device having dedicated startup sequence control for a resonant converter, in accordance with some embodiments.

FIG. 3 is a high level flow chart of an iterative method 300 of adjusting pulse time by a semiconductor device having dedicated startup sequence control for a resonant converter, in accordance with some embodiments. The method can be carried out by, for example, a switch controller 136 that includes a startup sequence circuit 146 in a resonant converter as shown in FIG. 1. At the start 302, sufficient input voltage has been applied to the resonant converter and the resonant circuit has been depleted of charge. To start the method 300, the lower switch can be pulsed on for an initial on-time in step 304. The initial lower switch on-time can be preselected, and configurable. Subsequent to the lower switch being pulsed in step 304, an iterative process 305 is undertaken where, essentially, the upper switch is pulsed for increasingly longer durations after dead times when no lower switch switching occurs. When the dead time of a given iteration meets a startup exit value or criteria, the iterative process 305 is exited. The startup exit value is based on the on-time used for the upper switch for the present iteration, which is essentially a duty cycle determination and when the dead time duty cycle of the upper switch drive signal becomes small enough, then symmetric switching can commence.

In step 306 the upper switch drive signal is pulsed for a present on-time, which is at first an initial on-time 308 that can be configurable. Upon ending the pulse in step 306, a dead time counter is started in step 310. The half bridge signal is monitored in step 312 to detect the end of a rising edge of the half bridge signal, whereupon the dead time counter is stopped in step 314 to produce a present dead time for the present iteration of the iterative process 305. In step 316 the present dead time is compared to a startup exit value. The startup exit value is based on the on-time used for pulsing the upper switch drive signal in the present iteration of process 305. In some embodiments the startup exit value is twice the present on-time used for pulsing the upper switch (immediately prior to the dead time). If the dead time is not less than the startup exit value, then the method 300 proceeds to step 318 where the present upper switch on-time is incremented by a preselected amount or factor. In some embodiments, the present upper switch on-time is incremented by 50%. After incrementing the present on-time, another iteration of the process 305 is commenced by returning to step 306, using the incremented on-time as the present on-time for the present iteration of process 305. Essentially, as long as the dead time remains above a particular duty cycle defined by the on-time of the upper switch pulse in step 306 and the following dead time until step 314, the process 305 is repeated. As the on-time is incremented in step 318 with each iteration, the duty cycle changes.

In step 316, when the dead time is less than the startup exit value, the iterative process 305 is exited, and the method 300 commences to step 320, where the upper switch is pulsed again, but with the same on-time as used in the last iteration of process 305. After an appropriate guard time, after the upper switch pulse in step 320 the lower switch (i.e. the lower switch drive signal) is then pulsed for the same on-time as the upper switch in step 320, and then symmetric switching commences in step 322 where the upper switch drive signal and lower switch drive signal are alternatively pulsed in a non-overlapping manner and with equivalent on-times. The method 300 ends in step 324 where the resonant converter controller can undertake a soft startup sequence where PFM operation is engaged. Since, during the startup sequence, the upper switch is only turned on when the half bridge signal finishes rising, the switching is "soft," meaning low, or no current transients are evident through the upper switch when it is switched on. By avoiding the lower switch turn on, charge is accumulated in the resonant tank circuit, allowing the upper switch to be switched on for longer periods, thereby reducing the dead time duration and balancing voltage on the resonant capacitor in a shorter time compared to conventional startup where only symmetric switching is used. Thus, using the dedicated startup sequence, hard switching is avoided, and a steady symmetric switching state is reached sooner.

Figure 4:
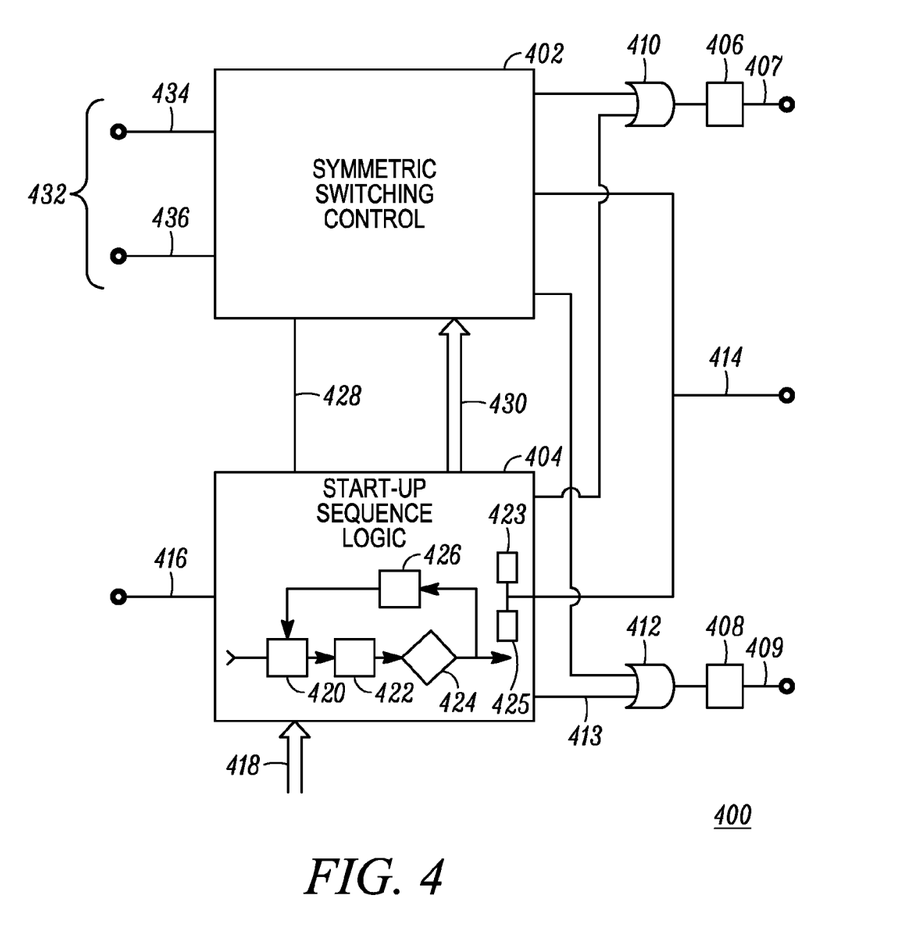
FIG. 4 is a block diagram of logic functions internal to a semiconductor device having dedicated startup sequence control for a resonant converter, in accordance with some embodiments.

FIG. 4 is a block diagram of logic functions 400 internal to a semiconductor device having dedicated startup sequence control for a resonant converter, in accordance with some embodiments. The logic functions include a symmetric switching control block 402 and a startup sequence logic block 404. Each of these blocks contain circuitry to implement the functions described herein. The symmetric switching block 402 can carry out the ordinary PFM switching operation after the dedicated startup sequence is complete, using inputs 432 such as a feedback signal 434 that corresponds to an output voltage of the resonant converter, and a current sense signal 436 that corresponds to a current through the resonant capacitor. Both blocks 402, 404 can provide signals to an upper switch driver 406 and a lower switch driver 408, through, for example, OR gates 410, 412, respectively. The upper driver 406 produces an upper switch drive signal 407 that can be coupled to the control terminal of an upper switch, and lower driver 408 produces a lower switch drive signal 409 that can be coupled to the control terminal of a lower switch. Both block 402, 404 are provided with a half bridge signal on line 414.

The startup sequence logic block 404 that includes circuitry that samples the input voltage 416 and/or detects any other start-up conditions that indicate that the resonant converter is being started up. When voltage is applied, circuitry in the startup sequence logic block 404 can disable the symmetric switching control block with a disable signal 428, which prevents the symmetric switching control block 402 from providing signals to either of the upper or lower drivers 406, 408, allowing the startup sequence logic to perform the dedicated startup sequence and drive the switches accordingly. When the input voltage 416 rises to a startup threshold, the startup sequence logic 404 will commence the startup sequence. In some embodiments circuitry in the startup sequence logic 404 can generate a signal or signals causing other circuit elements to discharge the resonant capacitor of the LLC resonant circuit, such as by asserting a signal on line 413 that causes the lower switch to operate in its linear region, providing a substantially resistive path through which charge in the resonant capacitor can be dissipated without a high current switching, as would occur upon driving the lower switch on. After the discharging operation is performed, if it is performed, the lower switch drive signal can be pulsed for an initial period of time, the duration of which can be provided 418, or otherwise configured. After the initial lower switch drive signal pulse, the startup sequence logic block 404 commences an iterative process. An upper switch on-time register 420 maintains a present upper switch on-time for a present iteration. The startup sequence logic block can assert a signal to the upper OR gate 410, which in turns asserts a signal to the upper switch driver 406, causing the upper switch drive signal to turn on the upper switch. The upper switch drive signal is asserted for the duration of the value or count time in the upper switch on-time register 420, at the end of which the upper switch drive signal is de-asserted, forming the end of a pulse. At the end of the upper switch on-time pulse, a dead time counter 422 commences counting. The dead time counter can be triggered by the rising edge of a pulse produced by a negative differential detector 425 that generates a pulse when the half bridge signal 414 is falling. The dead time counter 420 counts until the half bridge signal 414 rises, and then stops rising. To detect the end of the rising of the half bridge signal 414, a positive differential detector 423 can produce a pulse during a positive-going or rising edge of the half bridge signal. At the end of the pulse, i.e. the falling edge, produced by the positive differential detector 423, the half bridge signal has stopped rising. At the end of the dead time, a digital comparator 424 compares the dead time of the present iteration to a startup exit value that is based on the present upper switch on-time. If the present dead time for a given iteration is not less than the present startup exit value, then an incrementing function 426 increments the present upper switch on-time, and the incremented time becomes the upper switch on time in upper switch on-time register 420 for the next iteration, which commences immediately by pulsing the upper switch drive signal, and the process is repeated until the dead time is less than the startup exit value, and then the upper switch is again pulsed for the upper switch on-time of the last iteration, and then symmetric switching can commence by changing the disable signal 428. The startup sequence logic block 404 can also provide the present on-time value to the symmetric switching control block 402 as indicated by arrow 430. As will be appreciated by those skilled in the art, the logic functions described here can be implemented in a variety of configurations using a variety of different components.

It will be appreciated by those skilled in the art that the startup sequence control can be implemented in numerous embodiments, including as part of an integrated circuit device for a resonant power converter controller, having only hardware circuit elements. It can also be implemented, for example, using the circuitry of the microprocessor that executes instruction code in accordance with the teaching of the disclosure.

Figure 5:
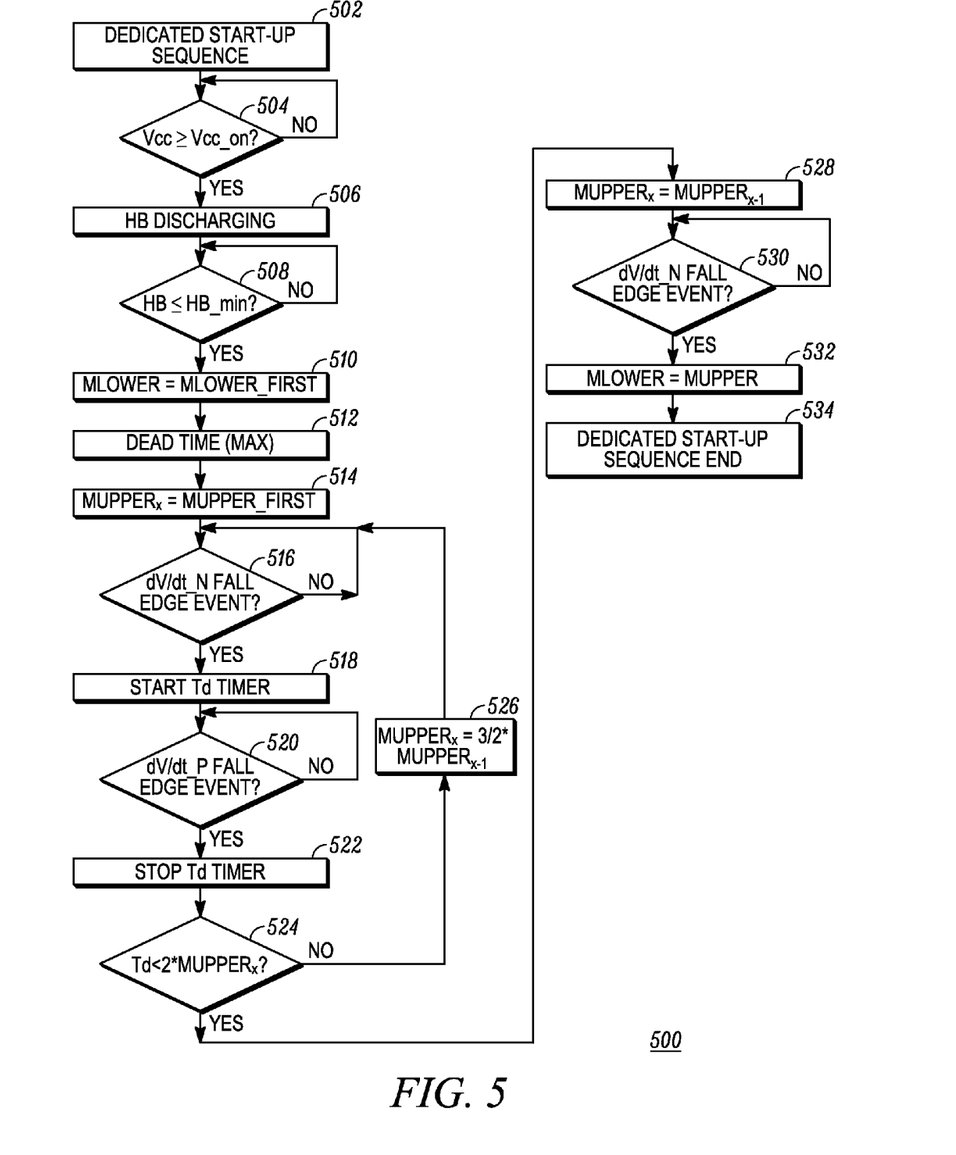
FIG. 5 is a detailed flow chart diagram of a method for a startup sequence for a resonant converter, in accordance with some embodiments.

FIG. 5 is a detailed flow chart diagram of a method 500 for a startup sequence for a resonant converter, in accordance with some embodiments. In step 502 input power has been applied and is high enough to enable the startup sequence logic, but not yet high enough to perform the actual startup sequence. The startup sequence logic can disable other switching control logic in the resonant converter controller. In step 504, the method 500 waits until the input voltage has risen to the startup threshold ($V_{cc} \geq V_{cc\_on}$), or another startup condition occurs. Once the input voltage has reached the startup threshold, the method 500 commences discharging the resonant capacitor in step 506, by, for example, switching the lower switch into a linear operating state, and discharging through the half bridge (HB) node to the input ground or return line. The discharging can continue in step 508 until the half bridge voltage is less than a minimum voltage ($HB \leq HB\_{min}$). In step 510 the lower switch drive signal is pulsed for an initial or first duration ($M_{lower} = M_{lower\_first}$). The initial lower pulse on-time can be set or otherwise configured for a desired duration, based on the particular application. In step 512 a dead time can be observed after the initial lower switch pulse of step 510.

The upper switch drive signal is then pulsed in step 514 for an initial period of time that can be set, selected, or otherwise configured. The end of the upper switch pulse can be detected in step 516 by detecting the rising edge of a negative differential pulse ($dV/dt\_N$) in step 516 that is produced by the falling edge of the half bridge voltage which occurs when the upper switch is shut off. Once the falling edge of the half bridge voltage is detected, the dead time ($T_d$) counter is started in step 518. The dead time count continues until the falling edge of a positive differential pulse is detected in step 520 ($dV/dt\_p$), indicating a rising edge of the half bridge signal has ended. Once the rising edge of the half bridge signal has stopped, the dead time counter is stopped in step 522. Immediately after stopping the dead time counter the startup sequence logic compares the present dead time with the present upper switch on-time multiplied by a factor of two, as the startup exit value ($T_d < 2*M_{upper\_tx}$), in step 524. If the present dead time is not less than the startup exit value in step 524, then the upper switch on-time is incremented in step 526 by a factor of 50% ($M_{upperx} = \frac{3}{2}*M_{upperx-1}$) so that the new present upper switch on-time is 50% longer than the previous upper switch on-time, and the upper switch drive signal is pulsed for a duration corresponding to the present (incremented) upper switch one time. Steps 524 and 526 occur very quickly so that there is no significant loss of time before the next upper switch drive signal pulse.

When the result of the comparison in step 524 indicates that the dead time is less than the startup exit value, meaning the dead time relative to the upper switch on time of a given iteration is below a given duty cycle of the upper switch drive signal, the method 500 exits the iteration process. In step 528 the upper switch drive signal is pulsed for an on-time equal to the last upper switch on-time ($M_{upperx} = M_{upperx-1}$). After the upper switch pulse in step 528 ends, the half bridge signal will begin falling, causing a negative differential detector to produce a pulse. When the half bridge signal ceases falling, the pulse produced by the negative differential detector will fall. The falling edge of the pulse produced by the negative differential detector is detected in step 530, and then the lower switch drive signal is pulsed in step 532 for a duration that is the same as that used for the upper switch drive signal in step 528 ($M_{lower} = M_{upper}$). At that point in the method 500, symmetric switching can then commence, and the dedicated startup sequence is finished in step 534.

Figure 6:
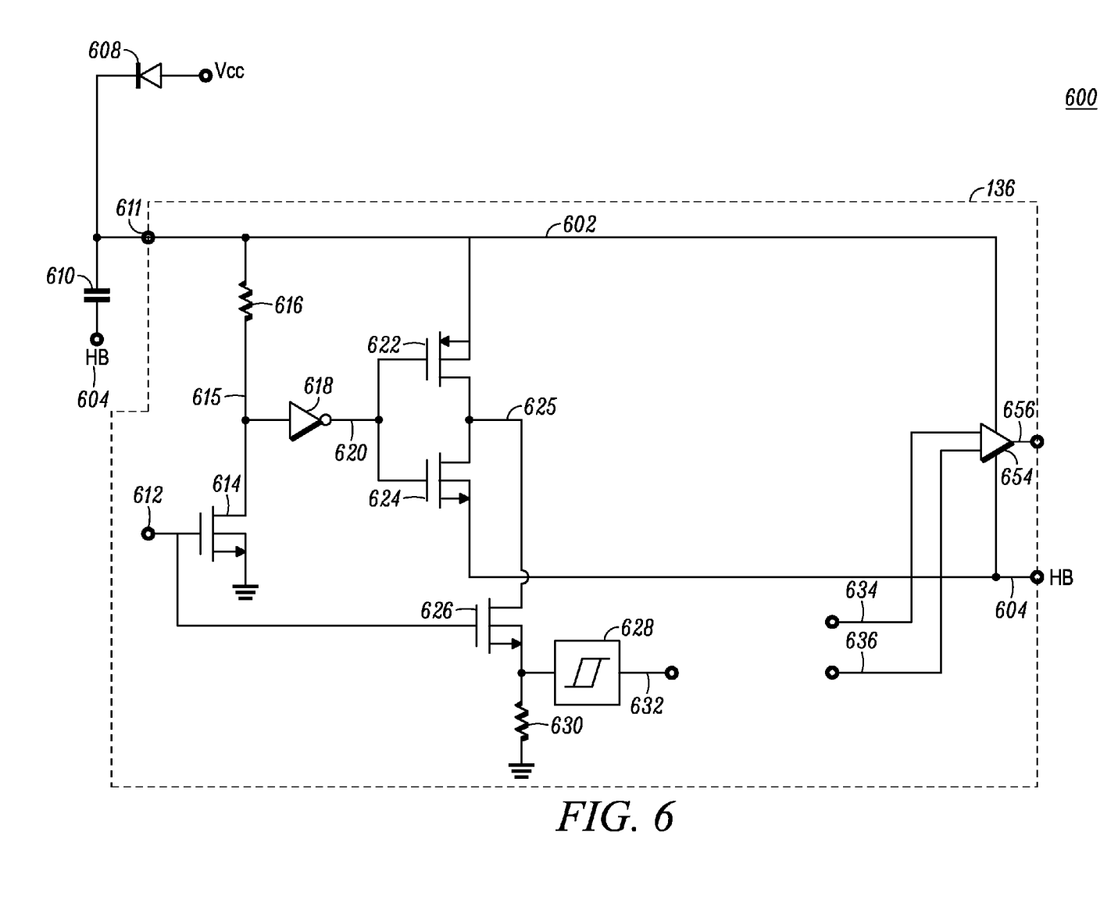
FIG. 6 is a circuit schematic diagram of a discharge circuit in accordance with some embodiments.

FIG. 6 is a circuit schematic diagram of a discharge circuit 600 in accordance with some embodiments. In some embodiments it is contemplated that discharge of the resonant capacitor through the half bridge node, such as half bridge node 114 of FIG. 1, can be accomplished by circuitry disposed internal to a switch controller, such as switch controller 136 of FIG. 1. In particular, circuitry can be disposed in the floating driver circuit used to drive the upper switch. A boot voltage line 602, during normal operation, provides a boot voltage overhead above the half bridge node 604 in order to supply voltage to drive the upper switch. To generate the boot voltage, in some embodiments a diode 608 is used with a bootstrap capacitor 610 in a boost configuration. When the half bridge node 604 is low (e.g. when switched to ground through the lower switch), the diode 608 provides a current for charging up the bootstrap capacitor 610 to the internal supply voltage $V_{CC}$, which is generated after the external HV supply is connected to the node 106 of FIG. 1. When the half bridge node 604 is switched to the input voltage level (e.g. when the upper switch is turned on), the diode 608 is reverse polarized and the boot line (602) is supplied from the bootstrap capacitor 610. The bootstrap capacitor 610 can be external to controller circuitry 136 of FIG. 1, for example, and provide a boot voltage to terminal 611.

However, at startup, prior to any switching activity, the boot voltage can be unknown, and in some cases can be essentially zero. The half bridge node 604, however, can have some charge if, for example, the resonant converter is restarted soon after being shut off. A discharge signal 612 can be asserted in response to control circuitry recognizing the startup condition, such as the input voltage rising above the startup threshold.

The discharge circuit 600 includes an N-channel enable transistor 614 that is responsive to a discharge signal 612 at a gate of the N-channel enable transistor 614. The N-channel enable transistor 614 drives an inverter 618 though a pull-up resistor 616 coupled to the boot voltage line 602 used to drive the upper switch signal 656. The discharge circuit 600 further includes a P-channel drive transistor 622 having a source connected to the boot voltage line 602 and a drain connected to a drain of an N-channel drive transistor 624. The N-channel drive transistor 624 has a source connected to the half bridge node 604. Both the P-channel drive transistor 622 and N-channel drive transistor 624 each have a gate coupled to an output of the inverter 618. The discharge circuit 600 further includes an N-channel discharge transistor 626 having a gate coupled to the gate of the N-channel enable transistor 614, a drain coupled between the P-channel drive transistor 622 and the N-channel drive transistor 624, and a source coupled to a grounded discharge resistor 630. The discharge circuit 600 further includes a discharge comparator 628 coupled to the discharge resistor 630 for sensing a half bridge voltage at the half bridge node 604 that is evident across the discharge resistor 630 during discharging. It will be appreciated by those skilled in the art that, for example, the gates of the N-channel enable transistor 614 and the N-channel discharge transistor 626 do not need to be coupled together, but that both must be turned on for discharging to occur. Thus, they can be driven independently, as well in the manner shown in FIG. 6, equivalently.

When the discharge signal 612 is asserted, N-channel enable transistor 614 turns on, pulling node 615 low through a pull up source, such as pull-up resistor 616. Voltage on node 615 is fed to an inverter 618, which produces a high signal level at its output 620 as a result. When output 620 is high, P-channel drive transistor 622 is turned off, and N-channel drive transistor 624 is turned on, which connects the half bridge node 604 to N-channel discharge transistor 626 over line 625. N-channel discharge transistor 626 can also be driven by the discharge signal 612, and when the discharge signal 612 is asserted, N-channel discharge transistor 626 will be turned on, thereby connecting the half bridge node 604 through N-channel transistors 624, 626 to discharge resistor 630. During discharge, the voltage of the half bridge node 604 is sensed across discharge resistor 630 by discharge comparator 628, which produces a discharge complete signal 632 to indicate when the voltage (of the half bridge node) has fallen to a discharge threshold. The discharge complete signal 632, when asserted, causes the startup logic of the switching controller (e.g. controller 136 of FIG. 1) to commence the startup switching sequence, which can include a wait time before turning on the lower switch. When the discharge signal 612 is not asserted (e.g. low), P-channel drive transistor 622 will be on and N-channel drive transistor 624 will be off, connecting the drain of N-channel discharge transistor 626 to the boot voltage line 602 which can prevent substrate injection when half bridge node 604 is negative with respect to ground.

The upper switch drive circuitry includes a double-ended buffer 654 that has an output capable of both sinking and sourcing current to overcome the gate capacitance of the upper switch with the upper switch drive signal 656. The buffer 654 is controlled by appropriate pulses at the set 634 and reset 638 lines, which can be provided internally by the switching controller, including during a startup sequence.

Figure 7:
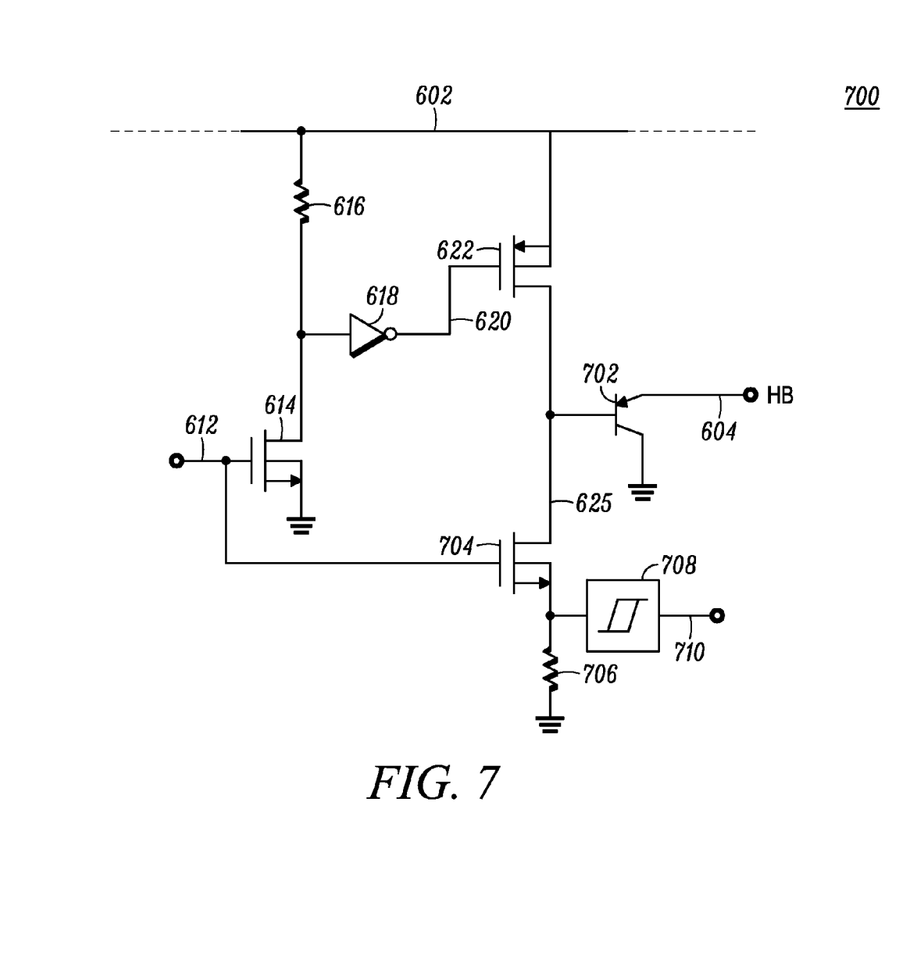
FIG. 7 is a circuit schematic diagram of a discharge circuit in accordance with some embodiments.

FIG. 7 is a circuit schematic diagram of a discharge circuit 700 in accordance with some embodiments. Discharge circuit 700 can use many of the same circuit elements as discharge circuit 600. The discharge circuit 700 includes an N-channel enable transistor 614 that is responsive to a discharge signal 612 at a gate of the N-channel enable transistor 614. The N-channel enable transistor 614 drives an inverter 618 though a pull-up resistor 616 coupled to the boot voltage line 602 used to drive the upper switch signal 656. The discharge circuit 700 further includes a P-channel drive transistor 622 having a source connected to the boot voltage line 602 and a drain connected to a drain of an N-channel drive transistor 704. The N-channel drive transistor 704 has a gate coupled to the gate of the N-channel enable transistor 614 and a source coupled to a grounded discharge resistor 706. The discharge circuit 700 further includes a PNP discharge transistor 702 having a base coupled between the P-channel drive transistor 622 and the N-channel drive transistor 704, an emitter coupled to the half bridge node 604 and a collector coupled to ground. The discharge circuit 700 further includes a discharge comparator 708 coupled to the discharge resistor 706 for sensing a half bridge voltage at the half bridge node 604 across the discharge resistor 706 (minus the emitter-base voltage of PNP discharge transistor 702) and providing an output 710 when the half bridge voltage falls below a discharge threshold.

When the discharge signal 612 is asserted, N-channel drive transistor 704 is turned on, and the base of PNP discharge transistor 702 is connected to discharge resistor 706 which linearly biases PNP discharge transistor 702, causing the PNP discharge transistor 702 to becomes resistive, allowing current to flow from the half bridge node 604 to ground through the emitter of PNP discharge transistor 702. As a result, the voltage at the half bridge node 604, less the emitter-base voltage of the PNP discharge transistor 702, will be evident across the discharge resistor 706 and sensed by the discharge comparator 708, which will assert the discharge complete signal 710 when the voltage across the discharge resistor 706 has fallen to the discharge threshold. When discharge signal 710 is not asserted (i.e. low), the base of the PNP discharge transistor 702 will be connected to the boot voltage line 602 through P-channel drive transistor 622 which can prevent the substrate injection when the half bridge node 604 is negative with respect to ground. In some embodiments, components 626 and 630 of FIG. 6, respectively, and components 704 and 706 of FIG. 7, can form a constant current sink in order to discharge half bridge node 604 smoothly, avoiding parasitic ringing on half bridge node 604 and reduce peak power dissipation of these discharge components.

Embodiments disclosed and taught in the preceding description and in the accompanying drawings provide the benefit of avoiding hard switching at the startup of a resonant converter. By avoiding hard switching, the switches used in the design of a resonant converter do not have to be selected to handle such high current, hard switching during startup, as is conventional. This means the switch transistors can be smaller than those required for reliable operation in a conventionally designed resonant converter where symmetric switching is commenced immediately upon startup, and no startup sequence is used.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method of operating a semiconductor device that includes a resonant converter controller, comprising:
   pulsing a lower switch drive signal initially for a preselected initial lower switch on-time;
   pulsing an upper switch drive signal for a preselected initial upper switch on-time responsive to pulsing the lower switch drive signal initially;
   iteratively measuring a dead time between a falling edge and a subsequent rising edge of a half bridge signal responsive to pulsing the upper switch drive signal, comparing a present dead time of a present iteration to a present startup exit value for the present iteration that is based on a present upper switch on-time for the present iteration, and, when the present dead time of the present iteration is above the startup exit value, incrementing the upper switch on-time by a preselected factor and pulsing the upper drive signal for the incremented upper switch on-time responsive to an end of the rising edge of the half bridge signal;
   when the present dead time of an iteration is below the present startup exit value, pulsing the upper switch drive signal again at the present upper switch on-time and setting a lower switch on-time to the present upper switch on-time; and
   commencing symmetric switching where the upper switch signal on-time and lower switching signal on-time are equal, responsive to the present dead time exceeding the startup exit value.

2. The method of claim 1, wherein comparing the present dead time of the present iteration to the present startup exit value for the present iteration comprises comparing the present dead time to a value that is twice the present upper switch on-time.

3. The method of claim 1, wherein incrementing the upper switch on-time by a preselected factor comprises incrementing the upper switch on-time by 50%.

4. The method of claim 1, wherein pulsing the lower switch drive signal initially for the preselected initial lower switch on-time comprises pulsing the lower switch drive signal for lower switch on-time that is provided from a source external to the semiconductor device.

5. The method of claim 1, further comprising, detecting a startup condition and disabling symmetric switching capability of the semiconductor device until the present dead time of an iteration is below the present startup exit value.

6. The method of claim 5, wherein detecting the startup condition comprises detecting an input voltage exceeding a startup threshold.

7. The method of claim 1, wherein measuring the dead time between the falling edge and the subsequent rising edge of the half bridge signal comprises measuring the time between a rising edge of a pulse produced by a negative differential detector that receives the half bridge signal and the falling edge of a pulse produced by a positive differential detector that receives the half bridge signal.

8. The method of claim 1, further comprising, prior to pulsing the lower switch drive signal initially, activating a discharge path that is electrically between a half bridge node of the semiconductor device and an input ground for a discharge time, and disabling the discharge path at the end of the discharge time.

9. The method of claim 8, wherein activating the discharge path comprises providing a signal to the lower switch sufficient to cause the lower switch to operate in a linear region.

10. The method of claim 8, wherein activating the discharge path comprises activating a discharge circuit driven from a boot voltage line used to drive the upper switch.

11. A resonant power converter controller semiconductor device, comprising:
   a startup sequence circuit that responds to a startup condition to disable a symmetric switching control block and pulse a lower switch drive signal for an initial time;
   the startup sequence circuit further, after it pulses the lower switch drive signal for the initial time, commences a startup sequence iteration to pulse the upper switch drive signal for a present upper switch on-time, measure a dead time between an end of the pulse of the upper switch drive signal and the end of a subsequent rising edge of a half bridge signal at a half bridge node and compare the dead time to a startup exit value in a comparison circuit;
   the startup sequence circuit further, when the dead time is greater than the startup exit value, increments the present upper switch on-time and conducts another startup sequence iteration using the incremented upper switch on time; and
   the startup sequence circuit further, when the dead time is less than the startup exit value, pulses the upper switch drive signal for the present upper switch on-time of a most recent iteration and sets a lower switch on time to the present upper switch on-time and then enables the symmetric switching control block.

12. The semiconductor device of claim 11, wherein the startup sequence circuit enables a discharge path between the half bridge node and a ground prior to initially pulsing the lower switch drive signal.

13. The semiconductor device of claim 12, wherein the startup sequence circuit enables the discharge path for a preselected period of time.

14. The semiconductor device of claim 12, wherein the startup sequence circuit enable the discharge path until a voltage of the half bridge node falls to a discharge threshold.

15. The semiconductor device of claim 12, wherein the startup sequence circuit enables the lower switch drive signal to a linear level.

16. The semiconductor device of claim 12, wherein the discharge path comprises:
   an N-channel enable transistor that, responsive to a discharge signal at a gate of the N-channel enable transistor, drives an inverter though a pull-up source coupled to a boot voltage line used to drive the upper switch signal;
   a P-channel drive transistor having a source connected to the boot voltage line and a drain connected to a drain of an N-channel drive transistor that has a source connected to the half bridge node, the P-channel drive transistor and N-channel drive transistor each having a gate coupled to an output of the inverter;
   an N-channel discharge transistor having gate that is driven with the gate of the N-channel enable transistor, a drain coupled between the P-channel and drive transistor and the N-channel drive transistor, and a source coupled to ground through a discharge resistor; and
   a discharge comparator coupled to the discharge resistor for sensing a half bridge voltage at the half bridge node across the discharge resistor and providing an output when the half bridge voltage falls below a discharge threshold.

17. The semiconductor device of claim 12, wherein the discharge path comprises:
   an N-channel enable transistor that, responsive to a discharge signal at a gate of the N-channel enable transistor, drives an inverter though a pull-up resistor coupled to a boot voltage line used to drive the upper switch signal;
   a P-channel drive transistor having a source connected to the boot voltage line, a gate coupled to an output of the inverter, and a drain connected to a drain of an N-channel drive transistor that has a source connected to ground through a discharge resistor and a gate that is driven with the gate of the N-channel enable transistor;
   a PNP discharge transistor having a base coupled to the drain of the P-channel drive transistor and to the drain of the N-channel drive transistor an emitter coupled to the half bridge node and a collector coupled to ground; and
   a discharge comparator coupled to the discharge resistor for sensing a half bridge voltage at the half bridge node across the discharge resistor and providing an output when the half bridge voltage falls below a discharge threshold.

18. A resonant power converter, comprising:
   an upper switch coupled between an input voltage line and a half bridge node;
   a lower switch coupled between the half bridge node and an input ground;
   a tank circuit including an inductance and a resonant capacitor coupled in series between the half bridge node and the input ground;
   a startup sequence circuit that initially pulses the lower switch for the initial time, and then commences a startup sequence iteration to pulse the upper switch for a present upper switch on-time, measure a dead time between an end of the pulse of the upper switch and the end of a subsequent rising edge of a half bridge signal at a half bridge node and compare the dead time to a startup exit value in a comparison circuit;
   when the dead time is greater than the startup exit value the startup sequence circuit increments the present upper switch on-time and conducts another startup sequence iteration using the incremented upper switch on time; and
   when the dead time is less than the startup exit value the startup sequence circuit pulses the upper switch drive signal for the present upper switch on-time of a most recent iteration and sets a lower switch on time to the present upper switch on-time and then enables a symmetric switching control block.

19. The resonant power converter of claim 18, wherein the startup sequence circuit enables a discharge path between the half bridge node and a ground prior to initially pulsing the lower switch drive signal.

20. The resonant power converter of claim 19, wherein the startup sequence circuit enable the discharge path until a voltage of the half bridge node falls to a discharge threshold.

* * * * *